W. D. MASON.
Fertilizer.
No. 27,729.  Patented Apr. 3, 1860.
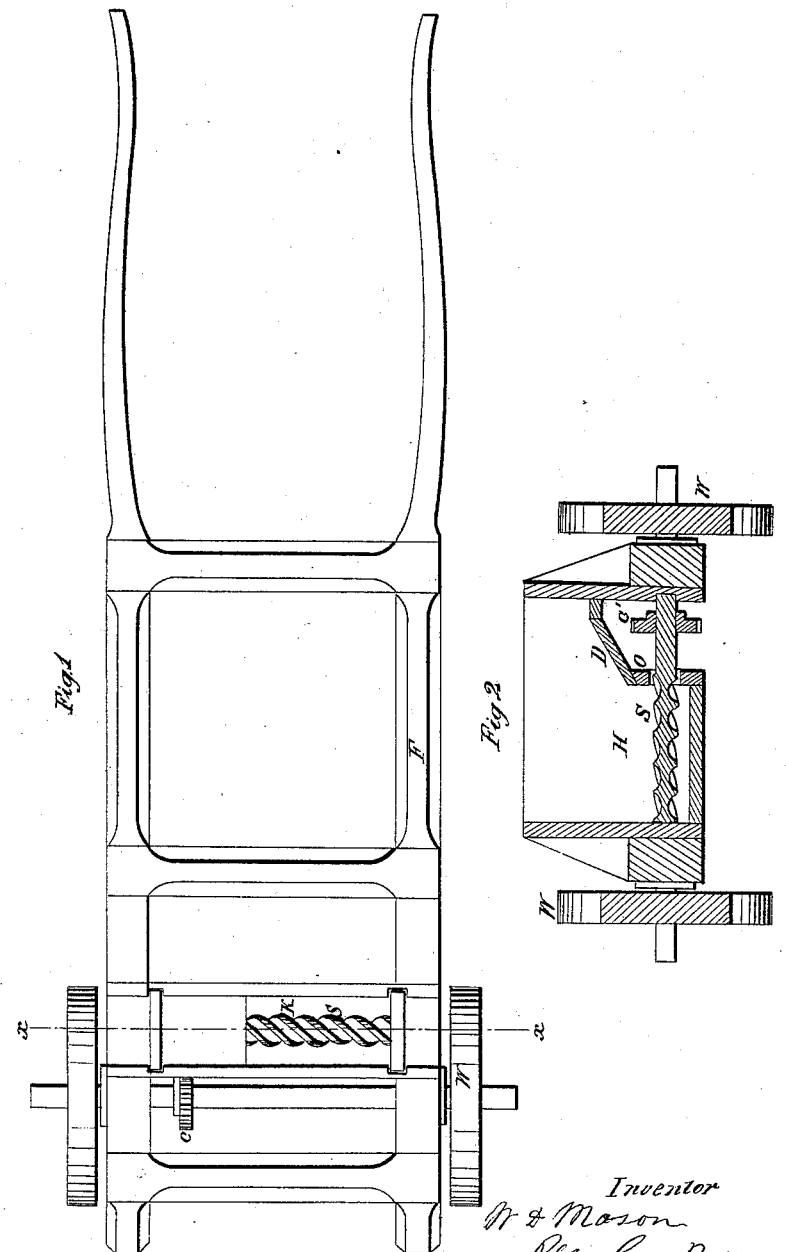

UNITED STATES PATENT OFFICE.

WM. D. MASON, OF JARRETT'S DEPOT, VIRGINIA.

IMPROVEMENT IN MACHINES FOR SOWING FERTILIZERS.

Specification forming part of Letters Patent No. 27,729, dated April 3, 1860.

*To all whom it may concern:*

Be it known that I, W. D. MASON, of Jarrett's Depot, in the county of Sussex and State of Virginia, have invented a new and useful Improvement in Manure-Sowers; and I do hereby declare that the following is a full, clear, and exact description of the same, reference being had to the annexed drawings, forming part of this specification, in the several figures of which similar characters of reference denote the same part.

Figure 1 is a top view, and Fig. 2 is a vertical section on $x\ x$.

The invention consists in the arrangement of devices set forth.

In the drawings, H is the hopper, through which runs a screw-conveyer, S, turned by cogged connection $c\ c'$, so as to discharge the manure from the end of the hopper into the furrow. A continual stream is thus kept up and fed from the end of the hopper under the offset $o$. F is the frame supported by driving-wheels W.

I am aware of the use of endless conveyers, and disclaim the screw S, separately considered; but

I claim—

The arrangement of the screw S, hopper H, with its offset $o$ and inclined plane D, gear-wheels $c\ c'$, driving-wheels W, and frame F, as set forth, the discharge taking place under the offset of the hopper, as described.

In testimony whereof I have hereunto signed my name before two subscribing witnesses.

W. D. MASON.

Witnesses:
GEO. PATTEN,
FR. S. MYER.